(12) United States Patent
Ding et al.

(10) Patent No.: US 9,049,707 B2
(45) Date of Patent: Jun. 2, 2015

(54) ANTENNA COMMUNICATION METHOD AND DEVICE

(71) Applicant: HUAWEI DEVICE CO., LTD., Shenzhen (CN)

(72) Inventors: Zhiming Ding, Shenzhen (CN); Guiming Shu, Shenzhen (CN); Zhiyong Zhang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 198 days.

(21) Appl. No.: 13/726,886

(22) Filed: Dec. 26, 2012

(65) Prior Publication Data

US 2013/0114540 A1     May 9, 2013

Related U.S. Application Data

(63) Continuation of application No. PCT/CN2011/079821, filed on Sep. 19, 2011.

(30) Foreign Application Priority Data

Sep. 20, 2010   (CN) .......................... 2010 1 0287454

(51) Int. Cl.
    *H04L 12/28*     (2006.01)
    *H04W 72/04*     (2009.01)
    *H04W 76/02*     (2009.01)

(52) U.S. Cl.
    CPC ............ *H04W 72/042* (2013.01); *H04W 76/02* (2013.01)

(58) Field of Classification Search
    CPC ..... H04W 72/04; H04W 88/08; H04W 76/00; H04W 80/04; H04W 36/0011; H04W 36/14; H04W 36/08

USPC .......................... 370/329, 331, 338, 348, 341
See application file for complete search history.

(56) References Cited

U.S. PATENT DOCUMENTS

2008/0105363 A1    5/2008   Ford
2009/0285176 A1*   11/2009   Zheng et al. .................. 370/331
2010/0131984 A1    5/2010   Kim

FOREIGN PATENT DOCUMENTS

CN     101056456     10/2007
CN     101188628     5/2008
(Continued)

OTHER PUBLICATIONS

International Search Report, dated Dec. 22, 2011, in corresponding International Application No. PCT/CN2011/079821 (4 pp.).
(Continued)

*Primary Examiner* — Dady Chery
(74) *Attorney, Agent, or Firm* — Staas & Halsey LLP

(57) ABSTRACT

An antenna communication method and device are provided. The antenna communication method includes: establishing a communication tunnel between a Customer Premises Equipment (CPE) and a mobile terminal; receiving, by the CPE, a first request message sent by the mobile terminal; receiving, by the CPE, first communication data of the mobile terminal through the communication tunnel after receiving the first request message, and sending the first communication data to the BS according to the air interface connection information in the first request message; and receiving, by the CPE, second communication data sent by the BS according to the air interface connection information in the first request message, and sending the second communication data to the mobile terminal through the communication tunnel.

12 Claims, 8 Drawing Sheets

(56) References Cited

FOREIGN PATENT DOCUMENTS

| CN | 101552679 | 10/2009 |
|---|---|---|
| WO | 2009/142336 | 11/2009 |

OTHER PUBLICATIONS

International Search Report, dated Dec. 22, 2011, in corresponding International Application No. PCT/CN2011/079821 (5 pp.).
Form PCT/ISA/220, dated Dec. 22, 2011, in corresponding International Application No. PCT/CN2011/079821 (3 pp.).
Form PCT/ISA/237, dated Dec. 22, 2011, in corresponding International Application No. PCT/CN2011/079821 (5 pp.).
Extended European Search Report dated Aug. 7, 2014 in corresponding European Patent Application No. 11826396.1.
English Translation of PCT Written Opinion of the International Searching Authority mailed Dec. 22, 2011 in corresponding International Application No. PCT/CN2011/079821.
Chinese Office Action mailed Jul. 25, 2013 in corresponding Chinese Application No. 201010287454.3.

* cited by examiner

ANTENNA COMMUNICATION METHOD AND DEVICE

CROSS-REFERENCE TO RELATED APPLICATIONS

This application is a continuation of International Application No. PCT/CN2011/079821, filed on Sep. 19, 2011, which claims priority to Chinese Patent Application No. 201010287454.3, filed on Sep. 20, 2010, both of which are hereby incorporated by reference in their entireties.

FIELD OF THE INVENTION

The present invention relates to the field of communications technologies, and in particular, to an antenna communication method and device.

BACKGROUND OF THE INVENTION

With the continuous development of wireless network communications technologies, a 3rd-generation (3G) wireless communication network gradually steps into the daily life of people. At present, 3G wireless communication network standards mainly include: Wideband Code Division Multiple Access (WCDMA), Code Division Multiple Access2000 (CDMA2000), Time Division-Synchronous Code Division Multiple Access (TD-SCDMA), and Worldwide Interoperability for Microwave Access (WiMAX). The 3G wireless communication network applies new technologies to achieve a high air interface rate, so that a network may allocate a high bandwidth for a user, which thereby improves data service experience of the user, and brings more new applications. However, in the 3G wireless network, the used frequency is high, for example, a WiMAX wireless network air interface uses 2.5 GHz spectrum, so a penetration capability of a 3G wireless network signal is weak, and the quality of an indoor and outdoor signal is apparently different accordingly.

Generally, user terminals in communication with the 3G wireless communication network include: a mobile terminal and a fixed terminal. The fixed terminal such as a computer equipment may perform data interaction with an external 3G wireless communication network through an indoor Customer Premises Equipment (CPE). The mobile terminal such as a mobile phone may directly access the 3G wireless network through a wireless network interface of the mobile phone when performing data interaction with the 3G wireless communication network outdoors. However, in the process of the data interaction between the mobile terminal and the 3G wireless network, if the mobile terminal is moved from an outdoor place to an indoor place, the quality of the communication between the mobile terminal and the 3G wireless network may not be ensured indoors since the signal of the 3G wireless network is weak.

SUMMARY OF THE INVENTION

Embodiments of the present invention provide an antenna communication method and device, so as to improve the quality of the communication between a mobile terminal indoors and a wireless network such as the 3G.

For the above purpose, the embodiments of the present invention adopt the following technical solutions.

An embodiment of the present invention provides an antenna communication method, which includes:

establishing, by a CPE, a communication tunnel with a mobile terminal;

receiving, by the CPE, a first request message sent by the mobile terminal, in which the first request message includes air interface connection information between the mobile terminal and a base station (BS) where the CPE is attached, and a network identification (ID) of a wireless network where the mobile terminal is located is the same as a network ID of the wireless network where the CPE is located;

receiving, by the CPE, first communication data of the mobile terminal through the communication tunnel after receiving the first request message, and sending the first communication data to the BS according to the air interface connection information in the first request message; and receiving, by the CPE, second communication data sent by the BS according to the air interface connection information in the first request message, and sending the second communication data to the mobile terminal through the communication tunnel.

An embodiment of the present invention provides an antenna communication method, which includes:

establishing, by n mobile terminal, a communication tunnel with a CPE, in which a network ID of a wireless network where the mobile terminal is located is the same as a network ID of the wireless network where the CPE is located;

sending, by the mobile terminal, a first request message to the CPE, in which the first request message includes air interface connection information between the mobile terminal and the BS where the CPE is attached;

sending, by the mobile terminal, first communication data to the CPE through the communication tunnel, so that the CPE sends the first communication data to the BS through the air interface connection information in the first request message; and receiving, by the mobile terminal, second communication data sent by the CPE through the communication tunnel, in which the second communication data is data received by the CPE from the BS according to the air interface connection information in the first request message.

An embodiment of the present invention further provides a CPE, which includes:

a first interface unit, configured to establish a communication tunnel with a mobile terminal;

a connection management unit, configured to receive a first request message sent by the mobile terminal, in which the first request message includes air interface connection information between the mobile terminal and the BS where the CPE is attached, and a network ID of a wireless network where the mobile terminal is located is the same as a network ID of the wireless network where the CPE is located; and a data management unit, configured to receive first communication data of the mobile terminal through the communication tunnel established by the first interface unit after the connection management unit receives the first request message, send the first communication data to the BS according to the air interface connection information in the first request message; and receive second communication data sent by the BS according to the air interface connection information in the first request message, and send the second communication data to the mobile terminal through the communication tunnel.

An embodiment of the present invention further provides a mobile terminal, which includes:

a local area network (LAN) interface, configured to send, by a mobile terminal, a first request message to a CPE, in which the first request message includes air interface connection information between the mobile terminal and the BS where the CPE is attached; and a tunnel management unit, configured to establish, by the mobile terminal, a communication tunnel with the CPE, in which a network ID of a wireless network where the mobile terminal is located is the same as a network ID of the wireless network where the CPE is located; send, by the mobile terminal, first communication data to the CPE through the communication tunnel, so that the CPE sends the first communication data to the BS through the air interface connection information in the first request message; receive, by the mobile terminal, second communication data sent by the CPE through the communication tunnel, in which the second communication data is data received by the CPE from the BS according to the air interface connection information in the first request message.

Through the antenna communication method and device according to the embodiments of the present invention, the communication tunnel is established between the CPE and the mobile terminal, so that the mobile terminal may perform data interaction with the CPE through the established communication tunnel. The CPE receives the first request message sent by the mobile terminal, in which the first request message includes the air interface connection information between the mobile terminal and the BS where the CPE is attached, and the network ID of the wireless network where the mobile terminal is located is the same as the network ID of the wireless network where the CPE is located. The first request message may be sent by the mobile terminal to the CPE through the established communication tunnel; and the CPE establishes an air interface connection with the BS according to the air interface connection information in the first request message, so that the mobile terminal performs the data interaction with the wireless network through the CPE. In this way, after the mobile terminal moves from an outdoor place to an indoor place where the CPE is located, the mobile terminal may share the antenna of the CPE and communicates with the BS of the wireless network through the CPE, which thereby greatly improves the quality of the communication between a mobile terminal and a wireless network such as the 3G indoors.

DETAILED DESCRIPTION OF THE EMBODIMENTS

The antenna communication method and device are described in detail in the following with reference to the specific embodiments and the accompanying drawings.

Figure 1:
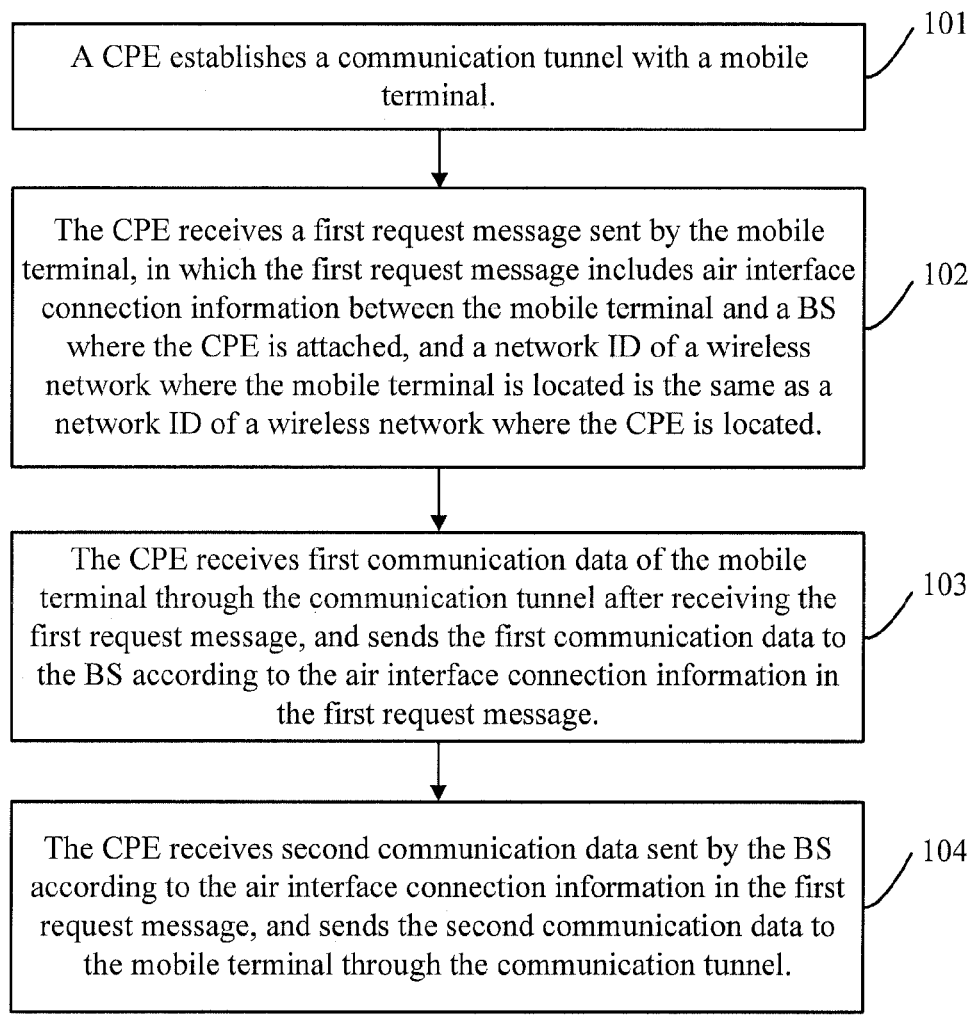
FIG. 1 is a flow chart of an antenna communication method according to an embodiment of the present invention.

As shown in FIG. 1, an embodiment of the present invention provides an antenna communication method, which includes the following steps.

Step 101: A CPE establishes a communication tunnel with a mobile terminal, in which the type of the communication tunnel may be an Internet Protocol (IP) tunnel or a Media Access Control (MAC)-layer channel.

Step 102: The CPE receives a first request message sent by the mobile terminal, in which the first request message includes air interface connection information between the mobile terminal and the BS where the CPE is attached, and a network ID of a wireless network where the mobile terminal is located is the same as a network ID of a wireless network where the CPE is located.

Step 103: The CPE receives first communication data of the mobile terminal through the communication tunnel after receiving the first request message, and sends the first communication data to the BS according to the air interface connection information in the first request message, in which the air interface connection information includes an air interface connection ID and uplink/downlink attribute information of the air interface connection.

Step 104: The CPE receives second communication data sent by the BS according to the air interface connection information in the first request message, and sends the second communication data to the mobile terminal through the communication tunnel. For example, according to the air interface connection information in the first request message, the CPE interacts with the BS an air interface MAC frame of the wireless network between the mobile terminal and the BS, and interacts with the mobile terminal the air interface MAC frame of the wireless network between the mobile terminal and the BS through the communication tunnel.

Figure 2:
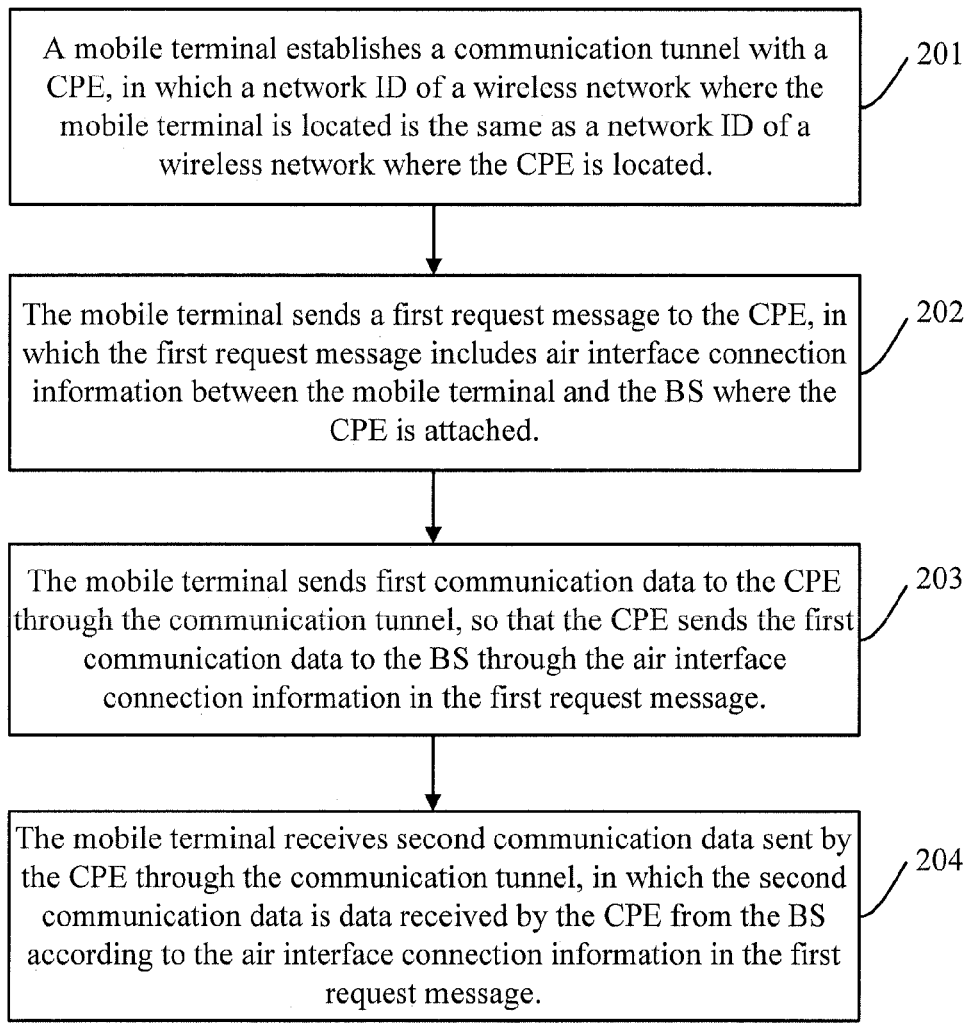
FIG. 2 is a flow chart of an embodiment of an antenna communication method according to the present invention.

As shown in FIG. 2, in an embodiment of an antenna communication method of the present invention, the method includes the following steps.

Step 201: A mobile terminal establishes a communication tunnel with a CPE, in which a network ID of a wireless network where the mobile terminal is located is the same as a network ID of a wireless network where the CPE is located.

Step 202: The mobile terminal sends a first request message to the CPE, in which the first request message includes air interface connection information between the mobile terminal and the BS where the CPE is attached.

Step 203: The mobile terminal sends first communication data to the CPE through the communication tunnel, so that the CPE sends the first communication data to the BS through the air interface connection information in the first request message. For example, the mobile terminal interacts with the CPE an air interface MAC frame of the wireless network between the mobile terminal and the BS through the communication tunnel.

Step 204: The mobile terminal receives second communication data sent by the CPE through the communication tunnel, in which the second communication data is data received by the CPE from the BS according to the air interface connection information in the first request message.

A WiMAX wireless Wide Area Network (WAN) is taken as an example in the following. It is supposed that, a mobile terminal which is a user terminal of the WiMAX wireless network, has a WiMAX wireless network interface and additionally has a Wireless Fidelity (WiFi) LAN interface. and a CPE is located in a room where the mobile terminal is located, and the CPE also has a WiMAX wireless network interface and a WiFi LAN interface, in which an uplink interface of the CPE is the WiMAX interface for communicating with the BS of the WiMAX wireless network, and a downlink interface of the CPE is the WiFi interface for locally communicating with the WiFi interface of the mobile terminal. The CPE may also communicate with the mobile terminal through other interfaces actually. For example, when the mobile terminal has one WiMAX wireless interface, the mobile terminal may further have a 3rd Generation Partnership Project (3GPP) wireless interface for communicating with the downlink interface of a 3GPP Femtocell of the CPE. The CPE may also communicate with the mobile terminal through Bluetooth or a wired Ethernet interface. The CPE may be a single physical equipment, or at least two separated physical equipments. When the CPE is the separated equipment, one part of the CPE is the CPE main body, which includes the WiMAX interface for communicating with the WiMAX BS; and the other part is a remote connection module of the CPE, which includes the WiFi interface for communicating with the mobile terminal. The two parts of the CPE may be connected to each other through manners such as Ethernet, and at this time, the communication between the two parts of the CPE is considered as communication inside the CPE, which is not described in detail herein.

Embodiment 1

Figure 3:
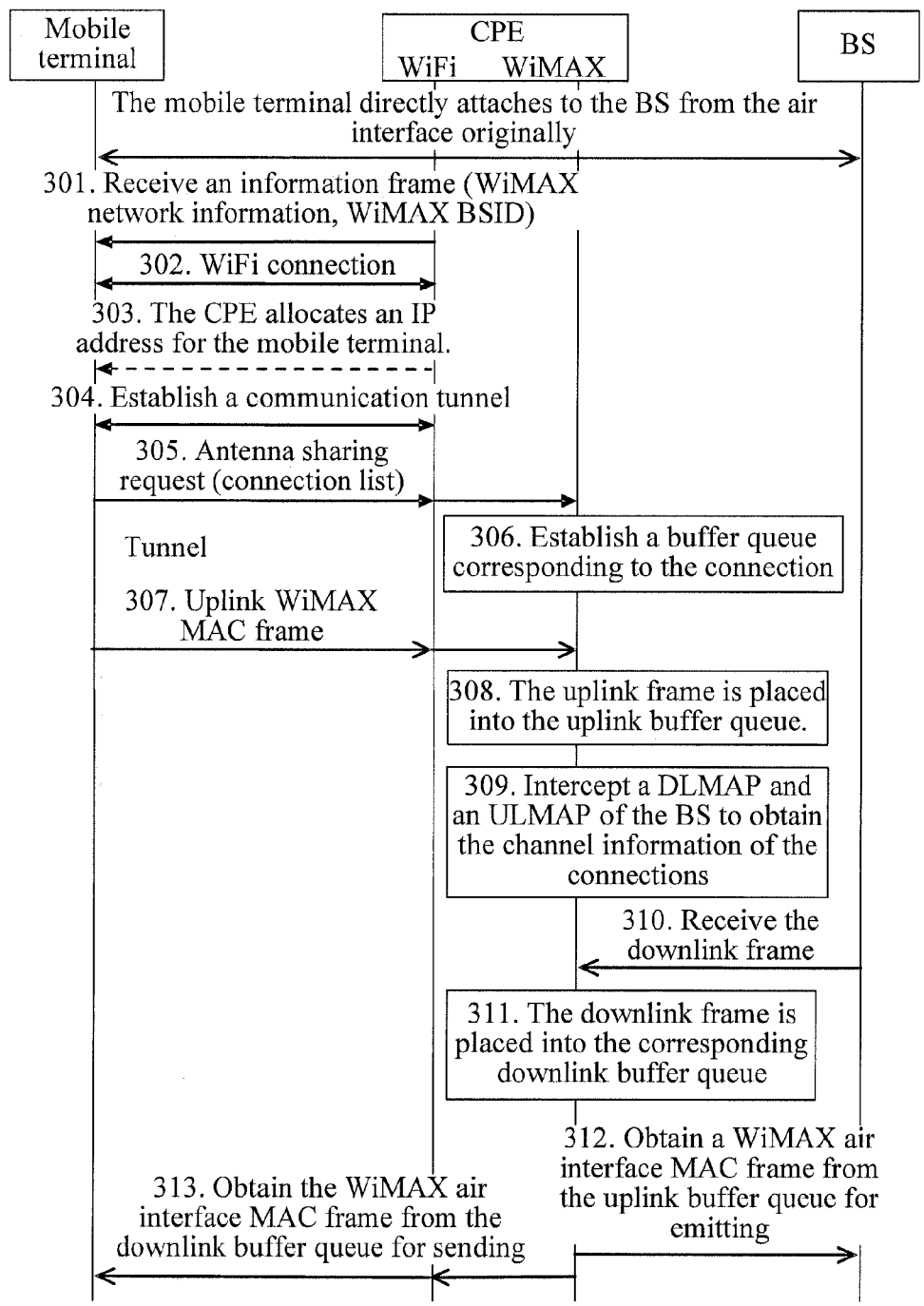
FIG. 3 is a flow chart of an antenna communication method according to Embodiment 1 of the present invention.

When the mobile terminal moves from an outdoor place to an indoor place, if a BS where the mobile terminal is attached outdoors is the same as the BS where the CPE is attached indoors, an embodiment of the present invention provides an antenna communication method, and a flow of the method is shown in FIG. 3. Specifically, the flow is as follows: it is assumed that the mobile terminal originally attaches to the BS directly through a WiMAX interface, and uses services at the time, and the mobile terminal is currently moved into an indoor place.

Step 301: The WiMAX interface of the mobile terminal receives an information frame sent by a CPE downlink wireless interface, in which the information frame carries information of a WiMAX wireless network connected to a CPE uplink interface, that is, the WiMAX interface, and the WiMAX wireless network information includes an ID of the WiMAX wireless network and an ID of the BS of the WiMAX wireless network where the CPE is attached. The information frame may be a periodically broadcasted WiFi beacon frame through the WiFi interface of the CPE, in which the WiFi beacon frame includes ID information of the WiMAX wireless network and the ID of the WiMAX BS where the CPE is attached, that is, the BSID.

It should be noted that, the mobile terminal may turn on two wireless interfaces at the same time, in which the WiMAX interface communicates, and the WiFi interface scans a WiFi access point of the CPE. For the purpose of power saving, the mobile terminal may turn off the WiFi interface when using the WiMAX interface for normal communication, and only turn on the WiFi interface when finding that the signal of the WiMAX interface is weak.

It also should be noted that, the mobile terminal may also actively send a WiFi Probe Request frame to the CPE, in which the Probe Request frame is also sent in a broadcasting manner, and CPE attribute information desired to be found, for example, the type of the CPE, is indicated in the Probe Request frame. After the CPE receives such a Probe Request frame, if the attribute of the CPE matches with the CPE attribute information indicated in the Probe Request frame, the CPE sends a probe response frame to the mobile terminal, in which the probe response frame includes information such as an ID of the WiMAX wireless network and the BSID. The ID of the WiMAX wireless network may be used to indicate whether the WiMAX wireless network connected to the CPE is the same as a WiMAX wireless network connected to the mobile terminal.

Step 302: The mobile terminal establishes an LAN connection with the CPE, that is, a WiFi connection, after finding the desired CPE. Specifically, if the mobile terminal finds that the CPE located in the same WiMAX wireless network as the mobile terminal (by comparing the network IDs) according to the information frame (for example, the WiFi beacon frame or the probe response frame), and that the BS where the CPE is attached is the same as the BS where the mobile terminal is attached (by comparing the BSIDs), the mobile terminal establishes the connection with the CPE. Reference is made to IEEE 802.11 standard for a specific connection process of the establishing the connection with the CPE, and the details is not described herein again. The CPE required by the mobile terminal has the following features.

The uplink interface of the CPE is the WiMAX interface, and is connected to the same WiMAX wireless network as the mobile terminal, and the BS where the CPE is attached is the same as the BS where the mobile terminal is attached.

It should be noted that, in the process of the mobile terminal connecting to the CPE through the WiFi interface, the CPE may be required to authenticate the mobile terminal. For example, if the CPE is an internal equipment of a user family of the mobile terminal, the user may configure information such as an account and a key used during the authentication of the WiFi interface of the CPE and the WiFi interface of the mobile terminal; and if the CPE is a hotspot equipment in a public place, the mobile terminal may obtain information such as the WiFi account and the key for connection with the CPE through other ways, for example, the account and the key is pre-configured at the same time with the WiMAX account information. The authentication process is the same as the authentication process in the prior art, which is not described in detail herein again. According to the WiFi standard, the CPE may also not authenticate the mobile terminal, that is, the access of the mobile terminal is allowed all the time.

Step 303: The CPE allocates an IP address for the mobile terminal, and sends the IP address allocated for the mobile terminal and the IP address of the CPE to the mobile terminal. The specific implementation of the step is as follows.

S1: The CPE receives an address allocation request from the mobile terminal.

S2: The CPE allocates a private network IP address for the mobile terminal.

S3: The CPE sends the IP address of the CPE itself and the private network IP address to the mobile terminal.

Here, the CPE may be considered as a gateway equipment between the LAN (Local Area Network) and the WiMAX wireless network. The IP address of the CPE is an IP address presented at the downlink interface of the CPE, that is, an IP address at the LAN side. A WAN (Wide Area Network) side of the CPE is the WiMAX interface, the LAN side is the WiFi interface, and the two sides may use different IP addresses. The WAN side uses a public network IP address obtained from the WiMAX wireless network, and the LAN side may use a predefined private network IP address. Definitely, the CPE may also use, at the WiFi interface, a public network IP address obtained at the WAN side.

The process of requesting the IP address by the mobile terminal is generally implemented through a Dynamic Host Configuration Protocol (DHCP), which is as described in the steps S1, S2 and S3, and is not described in detail herein again. The mobile terminal may request the IP address in other manners, for example, auto-selection. That is, the mobile terminal randomly selects an IP address, then detects whether the selected IP address is used by other equipments in the LAN where the mobile terminal is located, and if the IP address is used by other equipments, randomly selects another address till an available IP address is selected. The mobile terminal may also select an IP address from an available IP address pool broadcasted by the CPE, and then informs the CPE of the selected IP address. The way of obtaining an IP address by the mobile terminal is not the attention of the present invention, and persons skilled in the art should know various IP address allocating methods, which are not described in detail herein.

It should be noted that, the step 303 is performed to establish an IP tunnel between the mobile terminal and the CPE, and is an optional step.

Step 304: The mobile terminal establishes a communication tunnel with the CPE. The established tunnel may be an IP tunnel or an MAC-layer tunnel. For example, when the IP tunnel is established between the mobile terminal and the CPE, one end of the tunnel is a mobile terminal side, and the address of the end is the private network IP address allocated by the CPE for the mobile terminal; and the other end of the tunnel is a CPE side, and the address of the other end is the IP address of the CPE. The IP tunnel may be an IP security encapsulation (IPsec) tunnel, a Generic Routing Encapsulation (GRE) tunnel, or tunnels in other forms, and is configured to transmit a WiMAX air interface MAC frame between the mobile terminal and the BS of the WiMAX wireless network. When a MAC-layer tunnel is established between the mobile terminal and the CPE, the WiMAX air interface MAC frame between the mobile terminal and the BS of the WiMAX wireless network is delivered as data of a WiFi MAC frame.

Step 305: The mobile terminal sends an antenna sharing request message to the CPE, in which the antenna sharing request message includes all the IDs of WiMAX air interface connections of the mobile terminal on the BS where the mobile terminal is attached and attribute information of the connections. The attribute information of the connections is configured to differentiate whether the connections are applied to an uplink frame or a downlink frame, or whether the connections are applied to an uplink frame and a downlink frame at the same time, that is, bi-directional connection. The attribute information of the connections may include Quality of Service (QoS) parameters of the connections, so that when the CPE forwards the air interface MAC frame between the mobile terminal and the BS, the CPE performs scheduling according to the QoS parameters of each of the air interface connections.

It should be noted that, the mobile terminal may also send the terminal ID of the mobile terminal itself to the CPE. The terminal ID may be an MAC address of the WiMAX interface of the mobile terminal or a tunnel ID allocated by the CPE and obtained during the establishment of the communication tunnel, or the obtained private network IP address is directly used as long as the CPE may identify the mobile terminal of the connection. It is not necessary for the mobile terminal to send the ID of the mobile terminal itself to the CPE, and the CPE may use the IP address or the WiFi MAC address of the mobile terminal obtained from the received request message as the ID of the mobile terminal.

It should be further noted that, the antenna sharing request message may be transmitted in the established tunnel; or the WiMAX air interface connection information of the mobile terminal is delivered through an IP-layer interface after an interface is defined at an IP layer, or through a WiFi management frame after a data element and/or a message type is defined in the WiFi management frame. The present invention does not limit a specific delivery method. When the WiMAX air interface connection information of the mobile terminal is delivered through the tunnel, indication information may be added to indicate the delivered information is the WiMAX air interface MAC frame or other defined signaling messages.

Step 306: After receiving the antenna sharing request from the mobile terminal, the CPE establishes a buffer queue for each connection of the mobile terminal according to the attribute information of the connection, in which the established corresponding buffer queue belongs to an uplink buffer queue or a downlink buffer queue according to the attribute of the connection. The uplink queue and the downlink queue are respectively established for the bi-directional connection. The uplink buffer queue is configured to buffer an uplink frame sent by the mobile terminal to the BS, and the downlink buffer queue is configured to buffer a downlink frame to be forwarded to the mobile terminal and received from the BS.

It should be noted that, the CPE establishes the buffer queue according to the connection and the attribute information of the connection sent by the mobile terminal, when the mobile terminal is informed to leave the CPE or the mobile terminal is not connected to the CPE any more, the CPE is required to delete the buffer queue related to the mobile terminal.

It should be further noted that, the CPE may also return a response message to the mobile terminal to indicate that the antenna sharing request message from the mobile terminal is received. If the CPE may not share the antenna with the mobile terminal due to resource limitation, the CPE indicates refusing the request in the response message.

It should be further noted that, the mobile terminal may also first send an inquiry request to the CPE, and then send the antenna sharing request carrying information of the connection and the attribute of the connection to the CPE according to the response of the CPE.

After completing the step 306, the mobile terminal may perform data interaction with the BS of the WiMAX wireless network through the CPE. The process of data interaction between the mobile terminal and the BS through the CPE is as follows.

Step 307: The mobile terminal sends an uplink WiMAX air interface MAC frame to the CPE.

The mobile terminal is connected to the CPE, instead of being directly connected to the BS, so the mobile terminal may immediately send a WiMAX air interface MAC frame to be sent to the CPE without waiting for a WiMAX air interface sending opportunity window. In fact, because the mobile terminal may not receive a signal of the BS well, the mobile terminal does not know the sending opportunity window of the mobile terminal itself The mobile terminal encapsulates the WiMAX air interface MAC frame to be sent into the tunnel between the mobile terminal and the CPE as described in the above for delivery. Specifically, if an IP tunnel is established between the mobile terminal and the CPE, the mobile terminal encapsulates the WiMAX air interface MAC frame into an IP packet, in which a source address of the IP packet is the private network IP address obtained by the mobile terminal from the CPE, and a destination address of the IP packet is the IP address of the CPE. A header of the IP packet indicates that the packet is a tunnel packet, and the type of the encapsulated data is the WiMAX air interface MAC frame. After the encapsulation, the IP tunnel packet is sent to the CPE through the WiFi interface.

If a layer 2 tunnel is established between the mobile terminal and the CPE, that is, MAC-layer tunnel of the WiFi, the mobile terminal directly uses the WiMAX air interface MAC frame as data, encapsulates the data into the WiFi data MAC frame (the WiFi MAC frame includes a data frame, a management frame and a control frame), and further indicates in the frame header that the frame is a tunnel frame, in which the encapsulated data is the WiMAX air interface MAC frame.

Step 308: The CPE places the uplink WiMAX air interface MAC frame of the mobile terminal into the uplink buffer queue.

All the uplink WiMAX air interface MAC frames on the mobile terminal need to be sent at time points arranged by the BS, and therefore, the CPE may not immediately send the WiMAX air interface MAC frames of the mobile terminal after receiving the frames, and the CPE first places the frames into the queues corresponding to the connections to which the WiMAX air interface MAC frames belong. The header of the WiMAX air interface MAC frame has a connection ID. The same processing is performed on a to-be-sent WiMAX air interface MAC frame generated by the CPE, and the frame also needs to be first placed into a respective connection buffer queue of the CPE. Therefore, the CPE may entirely consider the connection of the mobile terminal as the connection of the CPE, but a relevant WiMAX air interface MAC frame is sent by the mobile terminal instead of being generated by the CPE.

The connection IDs allocated by a BS for different WiMAX terminals (including the mobile terminal and the CPE here) are not repeated, so the CPE may simply obtain the connection ID from the header of the WiMAX air interface MAC frame of the mobile terminal, and then places the WiMAX air interface MAC frame into the queue to be sent corresponding to the connection ID obtained from the MAC frame header.

Step 309: The CPE intercepts a downlink mapping table (DLMAP) and an uplink mapping table (ULMAP) of the BS.

The WiMAX BS arranges some broadcasting information at the beginning of each physical frame, and the broadcasting information includes the DLMAP and the ULMAP. The IDs of the downlink air interface connections and start time points of the appearing of the WiMAX air interface MAC frames of the downlink connections are indicated in the DLMAP. The uplink air interface connections, time points of sending the WiMAX air interface MAC frames by the uplink connections, and duration of the sending are indicated in the ULMAP. After the broadcasting information, a downlink sub-frame and an uplink sub-frame (a physical frame) exist, and the WiMAX terminal may receive a WiMAX air interface MAC frame of a certain connection at a time point designated by the downlink sub-frame according to the information in the DLMAP, and sends an MAC frame of a certain connection at a time point designated by the uplink sub-frame.

Step 310: The CPE receives the downlink frame sent by the BS.

It should be noted that, the downlink sub-frame of the WiMAX BS appears before the uplink sub-frame in an uplink/downlink time division system, while the uplink sub-frame and the downlink sub-frame appear at the same time in an uplink/downlink frequency division system. After the CPE resolves the DLMAP, the CPE receives the MAC frames of the CPE and the MAC frames of the connections of the mobile terminal requesting antenna sharing.

Step 311: After receiving the WiMAX air interface MAC frames, the CPE places the frames into the corresponding downlink buffer queues according to the connection IDs in the frame header. Some of the downlink buffer queues belong to the CPE, and some belong to the mobile terminal, but at this time, the CPE is not required to differentiate which one belongs to the CPE and which one belongs to the mobile terminal.

Step 312: The CPE sends the uplink frame to the BS.

The CPE obtains the MAC frame to be sent from the uplink connection buffer queue for sending according to connection sending time window information obtained from the ULMAP during the period of the uplink sub-frame of the BS, in which the connection sending time window refers to the beginning time and duration of sending the connection designated in the ULMAP. The uplink connection buffer queue includes an uplink connection buffer queue of the CPE and an uplink connection buffer queue of the mobile terminal. The MAC frame in the connection buffer queue of the CPE is generated by the CPE, while the MAC frame in the connection buffer queue of the mobile terminal is received from the mobile terminal in step 307. The CPE is not required to differentiate which queue belongs to the CPE, and which queue belongs to the mobile terminal at this time, and is only required to obtain the MAC frame to be sent from the uplink buffer queue for sending, and meet the QoS requirements on each connection.

Step 313: The CPE forwards the WiMAX air interface MAC frame in the downlink connection buffer queue of the mobile terminal to the mobile terminal.

When the CPE processes the buffered MAC frame in each downlink buffer queue, if the downlink connection buffer queue of the mobile terminal includes a WiMAX air interface MAC frame to be processed, the CPE forwards the WiMAX air interface MAC frame to be processed to the mobile terminal through the WiFi interface. The CPE may find out the corresponding tunnel according to terminal ID information corresponding to a connection ID, and encapsulate the WiMAX air interface MAC frame in the downlink buffer queue into the tunnel to deliver to the mobile terminal. If the tunnel is an IP tunnel, the source address of the encapsulated IP packet is the IP address of the CPE, and the destination address of the encapsulated IP packet is the private network IP address allocated by the CPE for the mobile terminal.

From step 307 to step 313, two mutually independent processes are actually included, in which, the process that the mobile terminal sends the WiMAX air interface MAC frame to the BS is implemented through step 307, step 308, step 309 and step 312, and the process that the mobile terminal receives the WiMAX air interface MAC frame from the BS is implemented through step 309, step 310, step 311 and step 313.

Embodiment 2

Figure 4:
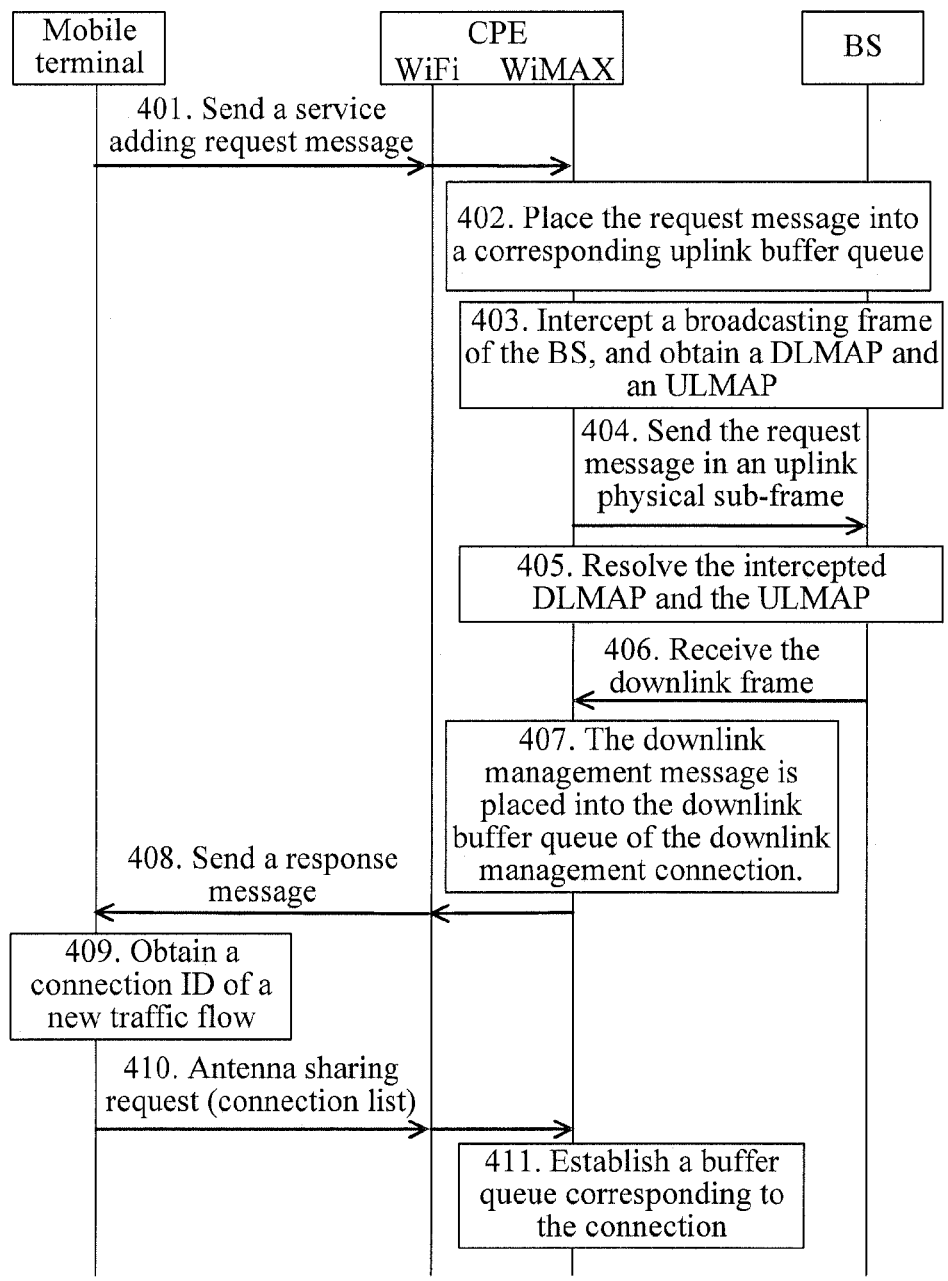
FIG. 4 is a flow chart of a method for requesting for establishing a new traffic flow on the basis of establishing antenna sharing between a mobile terminal and a CPE according to Embodiment 2 of the present invention.

In a WiMAX standard, a traffic flow is a specific session process from an application angle, for example, a call signaling traffic flow in a voice session process and a voice traffic flow after the establishment of the session. During the establishment process of the traffic flow, a BS allocates a connection ID for each traffic flow, so as to perform different processing on each traffic flow during transmission, and meet QoS requirements. The traffic flow is not constant, so the connection ID belonging to a mobile terminal is also not constant. The mobile terminal should immediately inform the CPE of the changing condition of the connection, so that the CPE establishes a new connection buffer queue or deletes the connection buffer queue FIG. 4 illustrates a process of updating connection information for the CPE by the mobile terminal after requesting for establishing a traffic flow, which specifically includes the following steps.

Step 401: The mobile terminal sends a traffic flow adding request message to the CPE, in which the message is specifically a dynamic service adding request (DSA-REQ), and delivers the message to the CPE through a tunnel of a WiFi interface.

Step 402: The CPE places the request message into a corresponding uplink buffer queue. The DSA-REQ belongs to a management message of a WiMAX air interface, the DSA-REQ needs to be buffered into a corresponding management connection buffer queue.

Step 403: The CPE intercepts broadcasting frame information of the BS, and obtains DLMAP and ULMAP. The mobile terminal has sent management connection information of the mobile terminal to the CPE, and has established a corresponding buffer queue, so the CPE may check a sending time window of the management connection of the mobile terminal in the ULMAP.

Step 404: The CPE sends a request message of the mobile terminal in an uplink physical sub-frame. After the CPE obtains the sending time window of the management connection of the mobile terminal, the CPE obtains the message to be sent from the uplink queue corresponding to the management connection of the mobile terminal in a designated time and sends the message, that is, the DSA-REQ of the mobile terminal is sent in this embodiment. It should be understood that, if the uplink queue of the management connection of the mobile terminal includes other management messages to be sent before the DSA-REQ, the DSA-REQ is unnecessarily sent in a following physical frame period, and is possibly sent in a next physical frame period.

Step 405: The CPE continues to intercept the broadcasting information of the BS, and resolves new DLMAP and ULMAP.

Step 406: If the CPE finds that the management connection of the mobile terminal has a downlink frame from the DLMAP, the CPE receives a mobile terminal management message from a downlink physical sub-frame at a designated time point, that is, the CPE receives a downlink frame carrying a response message of the request in this embodiment.

Step 407: The CPE places the received downlink management message, that is, the response message, into the downlink buffer queue of the management connection of the mobile terminal.

Step 408: The CPE obtains the response message from the downlink queue of the management connection of the mobile terminal, and sends the message to the mobile terminal through the tunnel.

Step 409: The mobile terminal resolves, from the response message, that the connection information is the connection ID of the new traffic flow of the mobile terminal.

Step 410: The mobile terminal sends an antenna sharing request message to the CPE, and places the connection of the new traffic flow or all the connection information into the antenna sharing request message and sends the message to the CPE.

Step 411: After receiving the antenna sharing request message from the mobile terminal, the CPE establishes a corresponding buffer queue for the new connection of the mobile terminal.

It should be noted that, if the mobile terminal always carries all the connection information of the mobile terminal in the antenna sharing request message, the CPE may check whether the connection buffer queue established for the mobile terminal matches the connection in the request message. If the connection of the established connection buffer queue is not included in the new request message, it means that the connection is deleted, and the CPE deletes the queue corresponding to the connection.

It should be noted that, step 410 and step 411 are the key steps for the process, that is, when the connection information of the mobile terminal is changed, the CPE needs to be immediately informed. Actually, changing conditions of the connection on the mobile terminal are varied, for example, the BS actively informs the mobile terminal to establish a new traffic flow, and a new connection is generated accordingly.

It should be further noted that, the mobile terminal or the BS may delete one traffic flow of the mobile terminal, and the corresponding connection is deleted accordingly. When the mobile terminal comes into a WiMAX free mode, some connections not used temporarily should also be deleted. The mobile terminal may use the antenna sharing request message to carry all the used connection information or expressly define a request message for deleting a designated connection, so as to inform the CPE that a certain connection is deleted, and persons skilled in the art may obtain the solution of the processes through simple inference, which is not described in detail herein.

Embodiment 3

Figure 5:
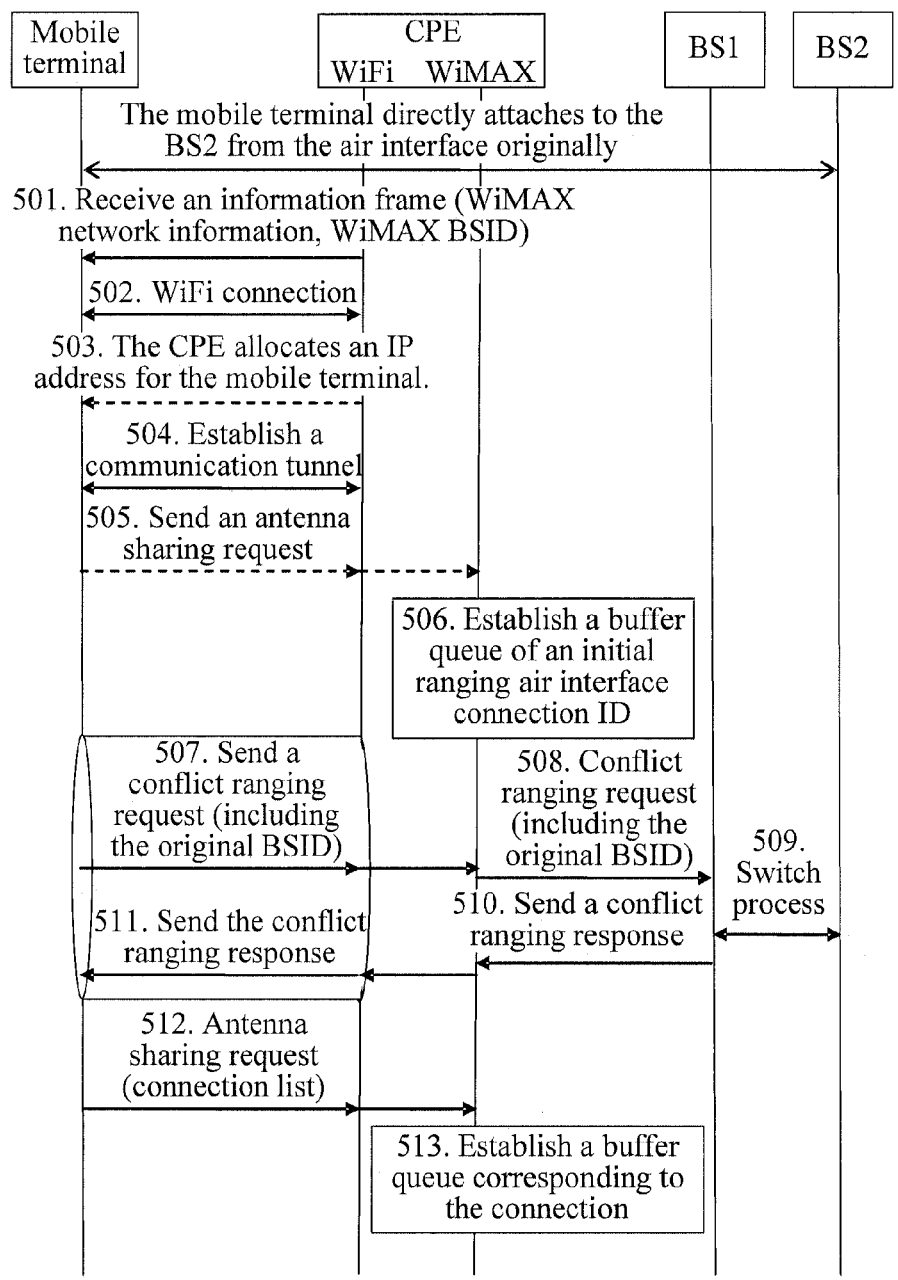
FIG. 5 is a flow chart of an antenna communication method according to Embodiment 3 of the present invention.

When the mobile terminal is moved from an outdoor place to an indoor place, if a BS where a CPE is attached is different from the BS where the mobile terminal is attached, and the two BSs belong to the same WiMAX wireless network, the mobile terminal may first implement the switch to the WiMAX BS where the CPE is attached on a WiMAX air interface before the mobile terminal is connected to a WiFi interface of the CPE, and afterwards establish a WiFi connection with the CPE. However, the mobile terminal possibly loses a WiMAX signal in the case that the mobile terminal does not complete the BS switch, and at this time, a flow of a communication method in the case that the mobile terminal shares an antenna of an indoor CPE is shown in FIG. 5. In addition, when the mobile terminal is powered on indoors, a process of initial access to the WiMAX wireless network may also be implemented through the CPE, which is shown in FIG. 5. The specific flow shown in FIG. 5 includes the following steps.

Step 501: The WiFi interface of the mobile terminal receives an information frame sent by the WiFi interface of the CPE, in which the information frame carries WiMAX wireless network information, and the WiMAX wireless network information includes a WiMAX wireless network ID and an ID of a WiMAX BS where the CPE is attached. The mobile terminal may determine according to the information carried in the information frame that the WiMAX wireless network connected to the CPE is the same as the WiMAX wireless network connected to the mobile terminal, but the BS where the CPE is attached is different from the BS where the mobile terminal is attached, or the WiMAX wireless network connected to the CPE is the same as the WiMAX wireless network the mobile terminal wants to be connected to, but the mobile terminal does not access the WiMAX wireless network connected to the CPE.

Step 502: The mobile terminal establishes a connection, that is, the WiFi connection, with the CPE after finding the required CPE. Reference is made to IEEE 802.11 standard for a specific connection process of establishing the connection, and the details is not described herein again.

Step 503: The CPE allocates an IP address for the mobile terminal, and sends the IP address allocated for the mobile terminal and the IP address of the CPE to the mobile terminal. The specific implementation of the step is as follows.

S1; The CPE receives an address allocation request from the mobile terminal.

S2: The CPE allocates a private network IP address for the mobile terminal.

S3: The CPE sends the IP address of the CPE itself and the private network IP address to the mobile terminal.

Here, the CPE may be considered as a gateway equipment between the LAN and the WiMAX wireless network. The IP address of the CPE is an IP address presented at the downlink interface of the CPE, that is, an IP address of the LAN side. A WAN side of the CPE is the WiMAX interface, the LAN side is the WiFi interface, and the two sides may both use different IP addresses. The WAN side uses a public network IP address obtained from the WiMAX wireless network, and the LAN side may use a predefined private network IP address. Definitely, the WiFi interface of the CPE may also use the public network IP address obtained at the WAN side.

The process of requesting the IP address by the mobile terminal may be implemented through a DHCP protocol, which is not described in detail herein again.

It should be noted that, step 503 is performed to establish an IP tunnel between the mobile terminal and the CPE, and is an optional step.

Step 504: The mobile terminal establishes a communication tunnel with the CPE. The established tunnel may be an IP tunnel or an MAC-layer tunnel. For example, when the IP tunnel is established between the mobile terminal and the CPE, one end of the tunnel is a mobile terminal side, and the address of the mobile terminal side is the private network IP address allocated by the CPE for the mobile terminal; and the other end of the tunnel is a CPE side, and the address of the CPE side is the IP address of the CPE. The IP tunnel may be an IPsec tunnel, a GRE tunnel, or tunnels in other types, and is configured to transmit a WiMAX air interface MAC frame between the mobile terminal and the BS of the WiMAX wireless network. When the MAC-layer tunnel is established between the mobile terminal and the CPE, the WiMAX air interface MAC frame between the mobile terminal and the BS of the WiMAX wireless network is delivered as data of a WiFi MAC frame.

Step 505: The mobile terminal sends an antenna sharing request message to the CPE, in which the mobile terminal does not obtain the connection allocated for the terminal by the BS where the CPE is attached, so a connection list in the antenna sharing request message merely includes an initial ranging air interface connection ID defined by a WiMAX standard, or may also not carry any connection information.

Step 506: After the CPE receives the antenna sharing request message, if the antenna sharing request message merely carries the initial ranging air interface connection ID, or does not carry any connection information, the CPE establishes a buffer queue of the initial ranging air interface connection ID for the terminal.

It should be noted that, if the connection information list in the antenna sharing request message is empty, it indicates that the CPE is informed to delete all connection buffer queues related to the terminal, so in this step, the request message should carry initial ranging air interface connection information.

The messages described in step 505 and step 506 may be transmitted through the tunnel, or may also not be transmitted in the tunnel. In this embodiment, step 505 and step 506 are indispensable.

Step 507: The CPE receives a ranging request for collision from the mobile terminal through the tunnel, and buffers the ranging request for collision into a corresponding connection buffer queue, in which the ranging request for collision should carry BSID information of the BS where the mobile terminal originally attached according to the WiMAX standard, and indicate that a ranging purpose is to switch the BS, or indicate that the ranging purpose is initial access. At this time, it is not required to carry the BSID information of the attached BS, and therefore the terminal does not attach to a certain BS. The ranging request for collision is ranging based on contention, the request message should further carry WiMAX MAC address information of the mobile terminal, and meanwhile, a connection ID of an MAC frame header is the initial ranging air interface connection ID. The term "based on contention" refers to that such a ranging request is sent in an uplink contention period. The uplink contention period is a period of the beginning of the uplink physical sub-frame, and the terminal not obtaining a valid connection ID sends the initial ranging request through contention in this period. However, the mobile terminal sends the request message to the CPE through the tunnel of the WiFi interface, and does not need to consider the contention period of the WiMAX interface. After the CPE receives such a WiMAX air interface MAC frame, the CPE processes the WiMAX air interface MAC frame in the same manner as a common WiMAX air interface MAC frame, that is, the CPE places the WiMAX air interface MAC frame into a corresponding uplink queue to be sent according to the connection ID of the frame header. However, as for the initial ranging air interface connection ID, each of the WiMAX terminal uses the same value, and the CPE may not correspond the WiMAX air interface MAC frame to the queue merely through this connection ID accordingly. Therefore, when the CPE finds that the connection ID in the message header is the initial ranging air interface connection ID, it is required to further obtain the MAC address of the mobile terminal from the message, and a corresponding buffer queue may be found only through the initial ranging air interface connection ID together with the MAC address of the mobile terminal.

The CPE may also merely establish one initial ranging buffer queue, and the initial ranging requests of all mobile terminals connected to the CPE are buffered into the queue, and are sent in the contention period one by one. In this way, step 505 and step 506 may be omitted.

Step 508: The CPE intercepts a broadcasting message of the BS, defines the contention period from ULMAP, obtains, from the buffer queue of the initial ranging air interface connection, the messages to be sent, and sends the messages in the contention period. If a plurality of buffer queues of the initial ranging air interface connection of the mobile terminals exist on the CPE, and carry messages to be sent, the CPE sequentially or randomly obtains the messages from the buffer queues and sends the messages according to the algorithm of the CPE itself Step 509: After the BS where the CPE is attached receives the ranging request for collision, the BS 1 where the CPE is attached triggers the switch process because the request message carries the BSID of the original BS and indicates that the ranging purpose is switch. The switch process includes an interaction between the BS where the CPE is attached and a BS 2 where the mobile terminal is attached, and the interaction between the BS where the CPE is attached and the gateway equipment of the WiMAX wireless network. Reference may be made to the WiMAX standard for the specific switch process, and the details are not described herein again. If the ranging request for collision indicates the initial access, the BS 1 where the CPE is attached implements the process of pre-attaching to the network for the mobile terminal. Reference may be made to the WiMAX standard for the specific process, and the details are not described herein again.

Step 510: The BS 1 where the CPE is attached sends a conflict ranging response message to the mobile terminal. All frame headers of the conflict ranging response message still use the initial ranging air interface connection ID, and the message should include the MAC address of the mobile terminal. The message includes the connection to be subsequently used allocated by the BS 1 for the mobile terminal. The CPE receives the conflict ranging response message from the downlink physical sub-frame.

It should be noted that, the conflict ranging response message identifies the mobile terminal where the message belongs necessarily through the connection ID of the frame header and the MAC address of the header. After the CPE receives the message, the CPE places the message into the initial ranging air interface connection downlink buffer queue corresponding to the mobile terminal where the message belongs according to the initial ranging air interface connection ID and the MAC address in the message.

Step 511: The CPE obtains, from the initial ranging air interface connection downlink buffer queue, a WiMAX air interface MAC message (that is, the conflict ranging response message) to be forwarded, and sends the message to the mobile terminal through a corresponding tunnel.

Step 512: After the mobile terminal receives the conflict ranging response message, the mobile terminal obtains the obtained connection ID and the attribute information of the obtained connection ID from the response message, and sends the antenna sharing request message to the CPE, in which the request message carries the currently obtained connection ID and the attribute information of the currently obtained connection ID, and may not further include the initial ranging air interface connection ID and the attribute information of the initial ranging air interface connecting ID.

Step 513: After the CPE receives the antenna sharing request message, the CPE establishes a corresponding buffer queue according to the connection ID and the attribute information of the connection ID carried in the request message, and may delete the initial ranging connection buffer queue.

After step 513, the process of the data interaction between the mobile terminal and the wireless network through the CPE is the same as the process described in step 307 to step 313 in FIG. 3, which is not described in detail herein again.

It should be noted that, when the mobile terminal needs to disconnect the WiFi connection with the CPE and directly connect to the BS through the WiMAX air interface, the connection removing process of the mobile terminal on the WiFi interface may directly cause that the CPE completely removes the connection buffer queues related to the mobile terminal, and even if the mobile terminal does nothing and leaves the CPE, a WiFi AP module on the CPE may automatically remove the connection with the mobile terminal because the WiFi AP module does not receive a WiFi signal of the mobile terminal, which triggers the CPE to completely remove the connection buffer queues related to the mobile terminal in the same way. Definitely, the mobile terminal may also send a message indicating that the mobile terminal will leave the CPE before removing the connection with the WiFi AP on the CPE, so that the CPE may delete the connection buffer queues related to the mobile terminal in time.

Figure 6:
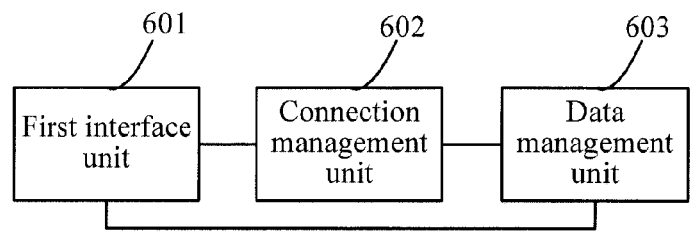
FIG. 6 is a schematic structural diagram of a CPE according to an embodiment of the present invention.

As shown in FIG. 6, an embodiment of the present invention provides a CPE, which includes: a first interface unit 601, a connection management unit 602 and a data management unit 603.

The first interface unit 601 is configured to establish a communication tunnel with a mobile terminal.

The connection management unit 602 is configured to receive a first request message sent by the mobile terminal, in which the first request message includes air interface connection information between the mobile terminal and a BS where the CPE is attached, and a network ID of a wireless network where the mobile terminal is located is the same as a network ID of the wireless network where the CPE is located.

The data management unit 603 is configured to receive first communication data of the mobile terminal through the communication tunnel established by the first interface unit after the connection management unit receives the first request message, send the first communication data to the BS according to the air interface connection information in the first request message; and receive second communication data sent by the BS according to the air interface connection information in the first request message, and send the second communication data to the mobile terminal through the communication tunnel.

Figure 7:
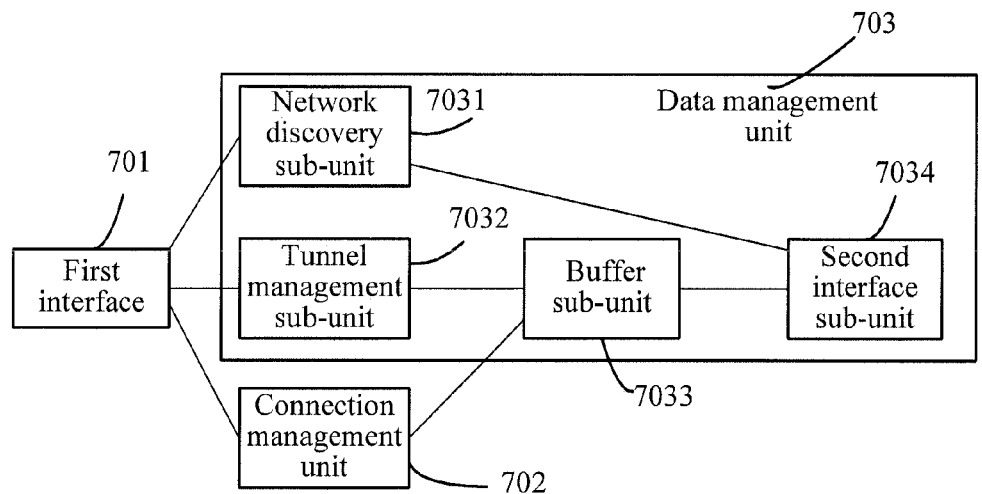
FIG. 7 is a schematic structural diagram of another CPE according to an embodiment of the present invention.

As shown in FIG. 7, an embodiment of the present invention provides another CPE, which includes: a first interface unit 701, a connection management unit 702, and a data management unit 703, in which the data management unit 703 further includes: a network discovery sub-unit 7031, a tunnel management sub-unit 7032, a buffer sub-unit 7033 and a second interface sub-unit 7034.

The first interface unit 701 is configured to establish a local area connection and a communication tunnel with a mobile terminal, send an information frame carrying wireless network information to the mobile terminal through the local area connection, in which the wireless network information includes an ID of a wireless network and an ID of a BS of the wireless network where the CPE is attached, and perform local area communication.

The network discovery sub-unit 7031 is configured to obtain wireless network information from the second interface, and send the wireless network information to the mobile terminal through the first interface unit.

The tunnel management sub-unit 7032 is configured to establish or remove a communication tunnel with the mobile terminal through the first interface, and send to the buffer unit an air interface uplink MAC frame between the mobile terminal and the BS obtained from a tunnel packet received from the first interface; and encapsulate into a tunnel packet an air interface downlink MAC frame between the mobile terminal and the BS obtained from the buffer unit, and send the tunnel packet to the mobile terminal through the first interface.

The connection management unit 702 is configured to process a first request message sent by the mobile terminal and received through the first interface, and according to the first request message, inform the buffer sub-unit to establish or delete a buffer queue corresponding to the air interface connection between the mobile terminal and the BS.

The buffer sub-unit 7033 is configured to establish or delete the buffer of the buffer queue, store an uplink MAC frame from the mobile terminal into the uplink buffer queue, and store a downlink MAC frame from the BS of the wireless network into the downlink buffer queue.

The second interface sub-unit 7034 is configured to send the uplink MAC frame stored in the buffer unit to the BS of the wireless network; and receive the downlink MAC frame delivered by the BS of the wireless network, and send the downlink MAC frame to the buffer unit for storage.

It should be noted that, the equipment may further include an address allocation unit.

The address allocation unit is configured to allocate an IP address for the mobile terminal.

Figure 8:
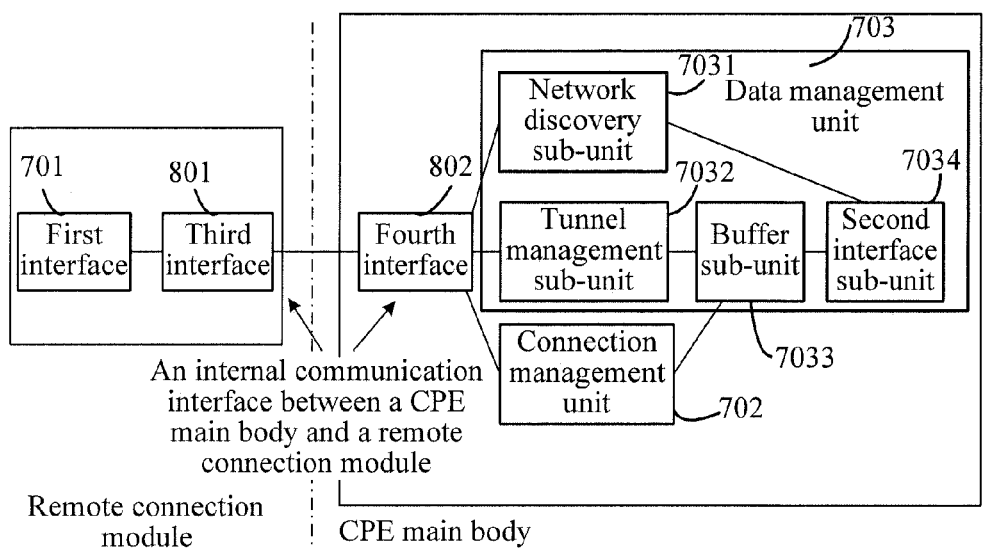
FIG. 8 is a schematic structural diagram of a distributed CPE according to an embodiment of the present invention.

FIG. 8 illustrates a distributed CPE according to an embodiment of the present invention, and as shown in FIG. 8, the CPE includes: a remote connection module and a CPE main body. The remote connection module includes: a first interface 701 and a third interface 801; and the CPE main body includes: a connection management unit 702 and a data management unit 703, in which the data management unit 703 includes: a network discovery sub-unit 7031, a tunnel management sub-unit 7032, a buffer sub-unit 7033 and a second interface sub-unit 7034; and the CPE main body may further include: a fourth interface 802.

The first interface unit 701 is configured to establish a local area connection and a communication tunnel with a mobile terminal, and send an information frame carrying wireless network information to the mobile terminal through the local area connection, in which the wireless network information includes an ID of a wireless network and an ID of a BS of the wireless network where the CPE is attached, and local area communication is performed.

The network discovery sub-unit 7031 is configured to obtain wireless network information from the second interface, and send the wireless network information to the mobile terminal through the first interface unit, in which the wireless network information includes: an ID of the wireless network and information of a wireless network BS where the CPE is attached.

The tunnel management sub-unit 7032 is configured to establish or remove a communication tunnel with the mobile terminal through the first interface, and send to the buffer unit an air interface uplink MAC frame between the mobile terminal and the BS obtained from a tunnel packet received from the first interface; and encapsulate into the tunnel packet an air interface downlink MAC frame between the mobile terminal and the BS obtained from the buffer unit, and send the tunnel packet to the mobile terminal through the first interface.

The connection management unit 702 is configured to process an antenna sharing request message sent by the mobile terminal and received through the first interface, and inform the buffer unit to establish or delete a buffer queue corresponding to the air interface connection between the mobile terminal and the BS according to the antenna sharing request message.

The buffer sub-unit 7033 is configured to establish or delete the buffer of the buffer queue, store the uplink MAC frame from the mobile terminal into the uplink buffer queue, and store the downlink MAC frame from the BS of the wireless network into the downlink buffer queue.

The second interface sub-unit 7034 is configured to send the uplink MAC frame stored in the buffer unit to the BS of the wireless network; and receive the downlink MAC frame delivered by the BS of the wireless network, and send the downlink MAC frame to the buffer unit for storage.

The third interface 801 is configured to send to the fourth interface the communication information received from the first interface; or transfer to the first interface the communication information received from the fourth interface for continuous sending.

The fourth interface 802 is configured to receive communication information sent by the third interface, and transfer the communication information to the tunnel management unit, the connection management unit, or the network discovery unit; or send to the third interface the communication information sent by the tunnel management unit, the connection management unit and the network discovery unit to the first interface.

Figure 9:
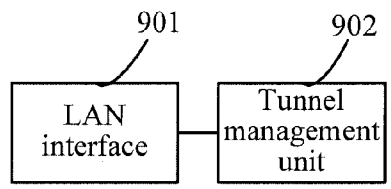
FIG. 9 is a schematic structural diagram of a mobile terminal according to an embodiment of the present invention.

As shown in FIG. 9, an embodiment of the present invention provides a mobile terminal, which includes: an LAN interface 901 and a tunnel management unit 902.

The LAN interface 901 is configured to send, by the mobile terminal, a first request message to the CPE, in which the first request message includes air interface connection information between the mobile terminal and a BS where the CPE is attached.

The tunnel management unit 902 is configured to establish, by the mobile terminal, a communication tunnel with the CPE, in which a network ID of a wireless network where the mobile terminal is located is the same as a network ID of the wireless network where the CPE is located; send, by the mobile terminal, first communication data to the CPE through the communication tunnel, so that the CPE sends the first communication data to the BS through the air interface connection information in the first request message; receive, by the mobile terminal, second communication data sent by the CPE through the communication tunnel, in which the second communication data is data received by the CPE from the BS according to the air interface connection information in the first request message.

Figure 10:
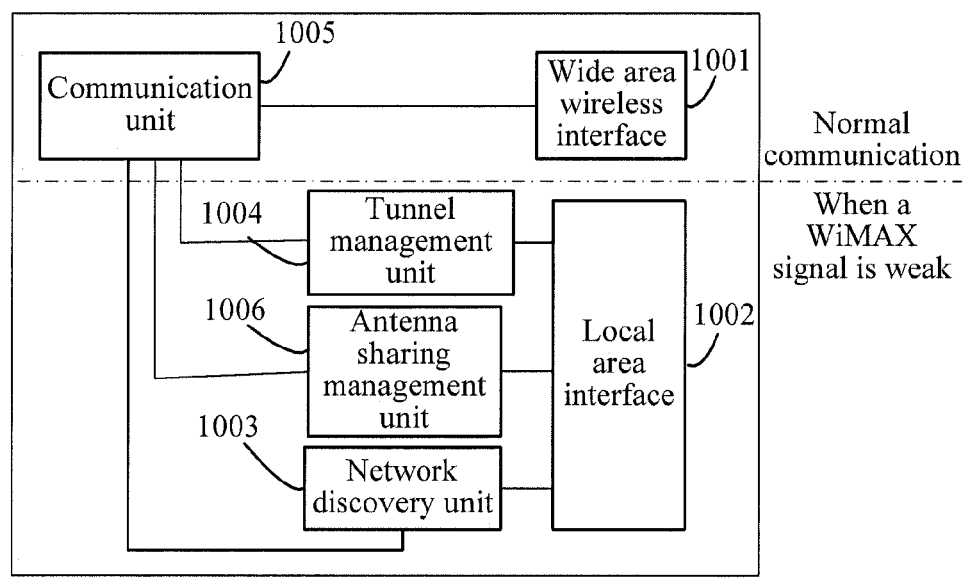
FIG. 10 is a schematic structural diagram of another mobile terminal according to an embodiment of the present invention.

As shown in FIG. 10, an embodiment of the present invention provides another mobile terminal, which includes: a wide area wireless interface 1001, a local area interface 1002, a network discovery unit 1003, a tunnel management unit 1004, a communication unit 1005 and an antenna sharing management unit 1006.

The wide area wireless interface 1001 is configured to communicate, by a mobile terminal, with a wireless network through the communication unit in a normal communication process, in which the wide area wireless interface is a WiMAX interface.

The local area interface 1002 is configured to send, by the mobile terminal, a first request message to the CPE, in which the first request message includes air interface connection information between the mobile terminal and a BS where the CPE is attached; and establish a connection with the CPE and perform local area communication, in which a WiFi interface is the local area interface.

It should be noted that, when the WiMAX signal is normal, the mobile terminal communicates with an external WiMAX wireless network through the communication unit 804 and the WiMAX interface. When the mobile terminal moves indoors, and the signal of the WiMAX wireless communication network is weak, the mobile terminal is required to connect to the CPE through the WiFi interface, and the mobile terminal communicates with the WiMAX wireless network through the CPE.

The network discovery unit 1003 is configured to receive the wireless network information sent by the CPE through the local area interface, and send the found wireless network information to the communication unit.

The tunnel management unit 1004 is configured to establish, by the mobile terminal, a communication tunnel with the CPE, in which a network ID of the wireless network where the mobile terminal is located is the same as a network ID of the wireless network where the CPE is located; send, by the mobile terminal, first communication data to the CPE through the communication tunnel, so that the CPE sends the first communication data to the BS through the air interface connection information in the first request message; receive, by the mobile terminal, second communication data sent by the CPE through the communication tunnel, in which the second communication data is data received by the CPE from the BS according to the air interface connection information in the first request message; and further establish or remove the communication tunnel with the CPE through the local area interface; encapsulate an uplink frame generated by the communication unit into a tunnel packet, and send the tunnel packet to the CPE through the local area interface; or obtain a downlink frame from a received tunnel packet, and transfer the downlink frame to the communication unit.

The communication unit 1005 is configured to generate the uplink frame and transfer the uplink frame to the tunnel management unit, or obtain the downlink frame from the tunnel management unit; configured to manage the wireless network information, in which the wireless network information includes an ID of the wireless network and information of the wireless network BS where the CPE is attached; and further configured to manage the air interface connection information between the mobile terminal and the BS.

The antenna sharing management unit 1006 is configured to obtain the air interface connection information from the communication unit, and send to the CPE the antenna sharing request message including the air interface connection information through the local area interface.

Through the embodiments of the present invention that provide an antenna communication method and device, the information frame including the wireless network information is sent to the mobile terminal through the CPE, and the communication tunnel is established between the CPE and the mobile terminal, so that the mobile terminal may interact with the CPE the wireless network air interface MAC frame between the mobile terminal and the BS where the CPE is attached through the established communication tunnel. The CPE receives the antenna sharing request message sent by the mobile terminal and the antenna sharing request message includes the air interface connection information between the mobile terminal and the BS , and interacts with the BS the wireless network air interface MAC frame between the mobile terminal and the BS according to the air interface connection information between the mobile terminal and the BS where the CPE is attached in the antenna sharing request message. In this way, after the mobile terminal moves from an outdoor place to an indoor place where the CPE is located, the mobile terminal may share the antenna of the CPE and communicates with the BS of the wireless network through the CPE, which thereby greatly improves the quality of the communication between the mobile terminal and the 3G wireless network indoors.

Persons skilled in the art should understand that all or a part of the steps of the method according to the embodiments of the present invention may be implemented by relevant hardware under the instruction of programs. The program may be stored in a computer readable storage medium. When the program is executed, the steps of the method according to the embodiment of the present invention are performed. The storage medium may be a ROM, a RAM, a magnetic disk, or an optical disk.

The above is only the specific implementation of the present invention, but the protection scope of the present invention is not limited herein. Any change or replacement that may be easily figured out by persons skilled in the art within the technical scope disclosed by the present invention shall be covered by the protection scope of the present invention. Therefore, the protection scope of the present invention shall be defined by the claims.

What is claimed is:

1. A wireless communication method, comprising:
    establishing, by a Customer Premises Equipment (CPE), a communication tunnel with a mobile terminal;
    receiving, by the CPE, a first request message sent by the mobile terminal, wherein the first request message comprises air interface connection information between the mobile terminal and a base station (BS) with which the CPE is attached, and determining, using a network identification (ID) of a wireless network in the first request message, that the mobile terminal and the CPE are located in the wireless network;
    receiving, by the CPE, first communication data of the mobile terminal through the communication tunnel after receiving the first request message, and sending the first communication data to the BS according to the air interface connection information in the first request message; and
    receiving, by the CPE, second communication data sent by the BS according to the air interface connection information in the first request message, and sending the second communication data to the mobile terminal through the communication tunnel, and
    wherein before the establishing, by the CPE, the communication tunnel with the mobile terminal, the method further comprises:
        sending, by the CPE, an information frame carrying wireless network information to the mobile terminal, wherein the wireless network information comprises an ID of the wireless network and an ID of the BS of the wireless network where the CPE is attached, so that the mobile terminal determines that the BS where the mobile terminal is attached is the same as the BS where the CPE is attached before sending the first request message.

2. The method according to claim 1, wherein before the establishing, by the CPE, the communication tunnel with the mobile terminal, the method further comprises:
    sending, by the CPE, an information frame carrying wireless network information to the mobile terminal, wherein the wireless network information comprises an ID of the wireless network and an ID of the BS of the wireless network where the CPE is attached;
    receiving a ranging request for wireless network collision sent by the mobile terminal through the communication tunnel, wherein the ranging request for wireless network collision is sent by the mobile terminal according to the ID of the BS of the wireless network where the CPE is attached when the mobile terminal determines that the BS where the mobile terminal is attached is different from the BS where the CPE is attached;
    sending the ranging request to the BS where the CPE is attached in a contention period of the BS, so that the BS where the CPE is attached implements, for the mobile terminal, a switch process from the BS where the mobile terminal currently attached to the BS where the CPE is attached or an initial access process;
    receiving a ranging response message sent by the BS where the CPE is attached, wherein the ranging response message comprises air interface connection information allocated for the mobile terminal by the BS where the CPE is attached; and
    sending the ranging response message to the mobile terminal through the communication tunnel.

3. The method according to claim 1, wherein before the establishing, by the CPE, the communication tunnel with the mobile terminal, the method further comprises:

receiving, by the CPE, a connection request of the mobile terminal;

allocating, by the CPE, an IP address for the mobile terminal; and sending, by the CPE, the IP address to the mobile terminal;

the establishing, by the CPE, the communication tunnel with the mobile terminal specifically comprises:

establishing, by the CPE, the communication tunnel with the mobile terminal according to the IP address allocated for the mobile terminal and the IP address of the CPE.

4. The method according to claim 1, wherein the air interface connection between the mobile terminal and the BS comprises an uplink air interface connection of the mobile terminal and a downlink air interface connection of the mobile terminal, and after the CPE receives the first request message sent by the mobile terminal, the method further comprises:

establishing an uplink buffer queue for the uplink air interface connection of the mobile terminal; and establishing a downlink buffer queue for the downlink air interface connection of the mobile terminal;

the receiving, by the CPE, the first communication data of the mobile terminal through the communication tunnel specifically comprises:

receiving an uplink Media Access Control (MAC) frame of the wireless network air interface sent by the mobile terminal through the communication tunnel, and buffering the uplink MAC frame in the corresponding uplink buffer queue;

the sending the first communication data to the BS according to the air interface connection information in the first request message specifically comprises:

intercepting an uplink mapping table (ULMAP) of the BS, and sending the uplink MAC frame in the uplink buffer queue in an uplink air interface connection time of the mobile terminal indicated in the ULMAP;

the receiving, by the CPE, the second communication data sent by the BS according to the air interface connection information in the first request message specifically comprises:

intercepting a downlink mapping table (DLMAP), receiving the downlink MAC frame delivered by the BS in a downlink air interface connection time of the mobile terminal indicated in the DLMAP, and storing the received downlink MAC frame in the corresponding downlink buffer queue;

the sending the second communication data to the mobile terminal through the communication tunnel specifically comprises:

sending the downlink MAC frame stored in the downlink buffer queue to the mobile terminal through the communication tunnel.

5. A wireless communication method, comprising:

establishing, by a mobile terminal, a communication tunnel with a Customer Premises Equipment (CPE), wherein a network identification (ID) of a wireless network sent from the mobile terminal is used to determine that the mobile terminal and the CPE are located in the wireless network;

sending, by the mobile terminal, a first request message to the CPE, wherein the first request message comprises air interface connection information between the mobile terminal and a base station (BS) where the CPE is attached;

sending, by the mobile terminal, first communication data to the CPE through the communication tunnel, so that the CPE sends the first communication data to the BS through the air interface connection information in the first request message; and receiving, by the mobile terminal, second communication data sent by the CPE through the communication tunnel, wherein the second communication data is data received by the CPE from the BS according to the air interface connection information in the first request message, and wherein before the establishing, by the mobile terminal, the communication tunnel with the CPE, the method further comprises:

receiving, by the mobile terminal, an information frame carrying wireless network information sent by the CPE, wherein the wireless network information comprises an ID of the wireless network and an ID of the BS of the wireless network where the CPE is attached; and determining, by the mobile terminal, that the BS where the mobile terminal is attached is the same as the BS where the CPE is attached according to the ID of the wireless network and the ID of the BS of the wireless network where the CPE is attached.

6. The method according to claim 5, wherein before the establishing, by the mobile terminal, the communication tunnel with the CPE, the method further comprises:

receiving, by the mobile terminal, an information frame carrying wireless network information sent by the CPE, wherein the wireless network information comprises an ID of the wireless network and an ID of the BS of the wireless network where the CPE is attached;

sending, by the mobile terminal, a ranging request for wireless network collision to the CPE through the communication tunnel according to the ID of the wireless network and the ID of the BS of the wireless network where the CPE is attached in the case that the mobile terminal determines that the BS where the mobile terminal is attached is different from the BS where the CPE is attached, so as to request for switching the BS where the mobile terminal is attached from the currently attached BS to the BS where the CPE is attached;

receiving, by the mobile terminal, a ranging response message from the CPE through the communication tunnel; and obtaining, by the mobile terminal, air interface connection information allocated for the mobile terminal by the BS where the CPE is attached from the ranging response message.

7. The method according to claim 5, wherein before the establishing, by the mobile terminal, the communication tunnel with the CPE, the method further comprises:

requesting, by the mobile terminal, the CPE to allocate an IP address for the mobile terminal, and obtaining the IP address of the CPE;

the establishing, by the mobile terminal, the communication tunnel with the CPE specifically comprises:

establishing, by the mobile terminal, an IP tunnel with the CPE according to the IP address allocated by the CPE and the IP address of the CPE.

8. The method according to claim 5, wherein the sending, by the mobile terminal, the first communication data to the CPE through the communication tunnel specifically comprises:

sending, by the mobile terminal, an air interface uplink Media Access Control (MAC) frame of the wireless network to the CPE through the communication tunnel;

the receiving, by the mobile terminal, the second communication data sent by the CPE through the communication tunnel specifically comprises:
receiving, by the mobile terminal, an air interface downlink MAC frame of the wireless network from the CPE through the communication tunnel.

9. A Customer Premises Equipment (CPE), comprising:
a first interface unit, configured to establish a communication tunnel with a mobile terminal;
a connection management unit, configured to receive a first request message sent by the mobile terminal, wherein the first request message comprises air interface connection information between the mobile terminal and a base station (BS) where the CPE is attached, and determining, using a network identification (ID) of a wireless network in the first request message, that the mobile terminal and the CPE are located in the wireless network; and
a data management unit, configured to receive first communication data of the mobile terminal through the communication tunnel established by the first interface unit after the connection management unit receives the first request message, send the first communication data to the BS according to the air interface connection information in the first request message; and receive second communication data sent by the BS according to the air interface connection information in the first request message, and send the second communication data to the mobile terminal through the communication tunnel, and
wherein the first interface unit is further configured to establish a local area connection with the mobile terminal, and send an information frame carrying wireless network information to the mobile terminal through the local area connection, wherein the wireless network information comprises an ID of the wireless network and an ID of the BS of the wireless network where the CPE is attached, and perform local area communication.

10. The CPE according to claim 9, wherein the data management unit comprises: a network discovery sub-unit, a tunnel management sub-unit, a buffer sub-unit and a second interface sub-unit;
the network discovery sub-unit is configured to obtain the wireless network information from the second interface sub-unit, and send the wireless network information to the mobile terminal through the first interface unit;
the tunnel management sub-unit is configured to establish or remove a communication tunnel with the mobile terminal through the first interface unit, and send an air interface uplink Media Access Control (MAC) frame between the mobile terminal and the BS obtained from a tunnel packet received from the first interface unit to the buffer unit; and encapsulate an air interface downlink MAC frame between the mobile terminal and the BS obtained from the buffer unit into the tunnel packet, and send the tunnel packet to the mobile terminal through the first interface unit;
the connection management unit is configured to process a first request message sent by the mobile terminal and received through the first interface unit, and inform the buffer sub-unit to establish or delete a buffer queue corresponding to the air interface connection between the mobile terminal and the BS according to the first request message;
the buffer sub-unit is configured to establish or delete the buffer queue, store the uplink MAC frame from the mobile terminal in an uplink buffer queue, and store the downlink MAC frame from the BS of the wireless network in a downlink buffer queue; and
the second interface sub-unit is configured to send the uplink MAC frame stored in the buffer unit to the BS of the wireless network; and receive the downlink MAC frame delivered by the BS of the wireless network, and send the downlink MAC frame to the buffer unit for storage.

11. The CPE according to claim 10, wherein when the first interface unit is disposed on a remote connection module of the CPE, the remote connection module further comprises a third interface, and a CPE main body comprises a fourth interface;
the third interface is configured to send communication information received from the first interface unit to the fourth interface; or transfer communication information received from the fourth interface to the first interface unit for continuous sending; and
the fourth interface is configured to receive the communication information sent by the third interface, and transfer the communication information to the tunnel management unit or the connection management unit or the network discovery unit; or send to the third interface the communication information sent by the tunnel management unit, the connection management unit and the network discovery unit to the first interface unit.

12. A mobile terminal, comprising:
a LAN interface, configured to send a first request message to a Customer Premises Equipment (CPE), wherein the first request message comprises air interface connection information between the mobile terminal and a base station (BS) where the CPE is attached; and
a tunnel management unit, configured to:
establish, by the mobile terminal, a communication tunnel with the CPE, wherein a network identification (ID) of a wireless network sent from the mobile terminal is used to determine that the mobile terminal and the CPE are located in the wireless network where the CPE is located;
send, by the mobile terminal, first communication data to the CPE through the communication tunnel, so that the CPE sends the first communication data to the BS through the air interface connection information in the first request message;
receive, by the mobile terminal, second communication data sent by the CPE through the communication tunnel, wherein the second communication data is data received by the CPE from the BS according to the air interface connection information in the first request message,
a wide area wireless interface, a communication unit, an antenna sharing management unit and a network discovery unit;
wherein the wide area wireless interface is configured to communicate, by the mobile terminal, with a wireless network through the communication unit in a normal communication process;
the LAN interface is further configured to establish a connection with the CPE and perform local area communication;
the network discovery unit is configured to receive wireless network information sent by the CPE through the LAN interface, and send the discovered wireless network information to the communication unit;
the tunnel management unit is further configured to establish or remove a communication tunnel with the CPE through the LAN interface; encapsulate an uplink frame generated by the communication unit into a tunnel packet, and send the tunnel packet to the CPE through the LAN interface; or obtain a downlink frame from a received tunnel packet, and transfer the downlink frame to the communication unit;

the communication unit is configured to generate the uplink frame and transfer the uplink frame to the tunnel management unit, or obtain the downlink frame from the tunnel management unit; configured to manage the wireless network information; and further configured to manage the air interface connection information between the mobile terminal and the BS; and the antenna sharing management unit is configured to obtain the air interface connection information from the communication unit, and send an antenna sharing request message comprising the air interface connection information to the CPE through the LAN interface.

* * * * *